Patented July 23, 1940

2,208,585

UNITED STATES PATENT OFFICE 2,208,585

PROCESS FOR THE MANUFACTURE OF CONDENSATION PRODUCTS FROM HALOGEN DERIVATIVES OF PHYTOL AND NUCLEUS ALKYLATED HYDROQUINONES

Paul Karrer, Zurich, Switzerland, assignor to Hoffmann-La Roche Inc., Nutley, N. J., a corporation of New Jersey No Drawing. Application April 26, 1939, Serial No. 270,238. In Switzerland April 29, 1938

3 Claims. (Cl. 260—625)

An iodine derivative of phytol is obtained by the action of hydrogen iodide on phytol in glacial acetic acid (Annalen der Chemie 354, year 1907, page 215). By using hydrogen bromide and acetic acid, a bromine derivative can be prepared.

It has now been found that these halogen derivatives of phytol can be converted into condensation products free from halogen with nucleus alkylated hydroquinones in presence of materials capable of combining with acids, such as sodium ethylate, sodium hydroxite, potassium hydroxide and the like. If trimethyl hydroquinone is employed for the reaction, a compound of the composition $C_{29}H_{50}O_2$ is formed. It follows from this that the compound has been formed from 1 mol of trimethyl hydroquinone and 1 mol of the phytol halogen derivative and that, most probably, it has a bicyclic structure.

The course of the reaction is very surprising, since, as a result of such reaction, only phytol ethers of nucleus alkylated hydroquinones could be expected.

The new compounds are obtained in the form of viscous oils. They are soluble in ether, benzine and chloroform and have a strong reducing action on silver nitrate solution. They are to be used as medicinal preparations.

Example 1

1.5 parts by weight of trimethyl hydroquinone are dissolved in a solution of 0.34 part by weight of sodium in 25 parts by weight of alcohol in a current of nitrogen. 4.5 parts by weight of the bromine compound resulting from the reaction between hydrogen bromide and phytol are added and the liquid boiled in a current of nitrogen for 2 hours. Sodium bromide separates and is filtered off. The filtrate is evaporated to dryness in vacuo, the residue taken up in ether, the ether solution washed with a solution of caustic soda and water, dried, and the solvent finally evaporated. A residue of about 3 parts by weight is left which is purified by preparing a chromatogram on aluminium oxide from petroleum ether solution. Impurities are found in the upper part of the tube and are separated. The extract of the centre layers gives the condensation product.

Example 2

3 parts by weight of 2,5-dimethyl hydroquinone are dissolved in a solution of 0.7 part by weight of sodium in 50 parts by weight of alcohol in a current of nitrogen. 9 parts by weight of the bromine compound of phytol as used in Example 1 are then added and the reaction mixture kept boiling in a current of nitrogen for 2 hours. The sodium bromide, which separates, is filtered off and the reaction product worked up in accordance with Example 1.

When preparing a chromatogram from petroleum ether solution, 3 layers are formed in the upper part of the aluminium oxide column. The desired condensation product is found in the 2 lower layers and can be eluted with a mixture of methanol and ether.

The condensation product is a brownish oil which has a strong reducing action on silver nitrate.

I claim:

1. Process for the manufacture of condensation products from halogen derivatives of phytol and nucleus alkylated hydroquinones, comprising reacting halogen derivatives of phytol with nucleus alkylated hydroquinones in presence of materials capable of binding acids.

2. Process for the manufacture of condensation products from halogen derivatives of phytol and nucleus alkylated hydroquinones, comprising reacting halogen derivatives of phytol with nucleus alkylated hydroquinones in presence of sodium methylate.

3. Process for the manufacture of condensation products from halogen derivatives of phytol and nucleus alkylated hydroquinones, comprising reacting halogen derivatives of phytol with nucleus alkylated hydroquinones in presence of alkali hydroxide.

PAUL KARRER.